(12) United States Patent
Feulner et al.

(10) Patent No.: US 12,122,321 B1
(45) Date of Patent: Oct. 22, 2024

(54) SEAT BELT SYSTEM AND VEHICLE SEAT HAVING A SEAT BELT SYSTEM

(71) Applicant: Bayerische Motoren Werke Aktiengesellschaft, Munich (DE)

(72) Inventors: Stefan Feulner, Pfaffenhofen (DE); Andre Kammler, Osnabrueck (DE); Michael Leng, Geltendorf (DE); Julia Sajko, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/287,486

(22) PCT Filed: Jun. 24, 2022

(86) PCT No.: PCT/EP2022/067368
§ 371 (c)(1),
(2) Date: Oct. 19, 2023

(87) PCT Pub. No.: WO2023/285110
PCT Pub. Date: Jan. 19, 2023

(30) Foreign Application Priority Data

Jul. 16, 2021 (DE) .................... 10 2021 118 456.8

(51) Int. Cl.
*B60R 22/26* (2006.01)
*B60R 22/32* (2006.01)

(52) U.S. Cl.
CPC ............ *B60R 22/325* (2013.01); *B60R 22/26* (2013.01)

(58) Field of Classification Search
CPC ....... B60R 22/26; B60R 22/32; B60R 22/322; B60R 22/325

(Continued)

(56) References Cited

U.S. PATENT DOCUMENTS 3,168,158 A * 2/1965 Schoeffler .............. H01H 35/14
280/801.1
6,682,009 B1 * 1/2004 Frank .................. B60R 22/3413
242/379.1

(Continued)

FOREIGN PATENT DOCUMENTS

DE 33 43 132 A1 6/1985
DE 19857387 C1 * 4/2000 ........... B60N 2/0232

(Continued)

OTHER PUBLICATIONS

Description Translation for IT 2019/00003445 from Espacenet (Year: 2019).*

(Continued)

*Primary Examiner* — Jason D Shanske
*Assistant Examiner* — Daniel M. Keck
(74) *Attorney, Agent, or Firm* — Crowell & Moring LLP

(57) ABSTRACT

A seat belt system for a vehicle seat includes a belt webbing, a belt tongue, and a belt buckle. The belt buckle has a releasing device and a first triggering element, which, in order to trigger the releasing device, can be moved in an opening direction such that the releasing device releases the belt tongue in the belt buckle. The seat belt system has a second triggering element. The second triggering element can be moved in the opening direction. The first triggering element and the second triggering element each have a gear rack and are connected to each other by way of a rotatable connecting element and two gears. The two gears are fastened to opposite ends of the connecting element for conjoint rotation and engage with a respective one of the gear racks.

8 Claims, 1 Drawing Sheet

(58) Field of Classification Search
USPC .................................................... 280/801.1
See application file for complete search history.

(56) References Cited

U.S. PATENT DOCUMENTS

2007/0256876 A1* 11/2007 Dramlitsch ............. B60R 22/28
                                                           280/801.1
2012/0279028 A1* 11/2012 Walega .................. B60R 22/32
                                                            24/572.1

FOREIGN PATENT DOCUMENTS

| DE | 102018221443 | A1 * | 6/2020 | |
|---|---|---|---|---|
| EP | 1880908 | A2 * | 1/2008 | ............. B60N 2/688 |
| EP | 2364888 | A1 * | 9/2011 | ............. B60N 2/688 |
| IT | 102019000003445 | A1 | 9/2020 | |
| WO | WO 2019/073323 | A1 | 4/2019 | |

OTHER PUBLICATIONS

International Search Report (PCT/ISA/210) issued in PCT Application No. PCT/EP2022/067368 dated Nov. 11, 2022 with English translation (4 pages).
German-language Written Opinion (PCT/ISA/237) issued in PCT Application No. PCT/EP2022/067368 dated Nov. 11, 2022 with English translation (7 pages).
German-language Office Action issued in German Application No. 10 2021 118 456.8 dated Oct. 6, 2022 with English translation (4 pages).
German-language Office Action issued in German Application No. 10 2021 118 456.8 dated Apr. 6, 2022 with English translation (6 pages).

* cited by examiner

SEAT BELT SYSTEM AND VEHICLE SEAT HAVING A SEAT BELT SYSTEM

BACKGROUND AND SUMMARY

The present invention relates to a seat belt system for a vehicle seat and a vehicle seat having such a seat belt system.

Seat belt systems for vehicle seats are known in various embodiments from the prior art.

DE 33 43 132 A1 discloses a seat belt system for a motor vehicle which comprises a seat belt buckle and a triggering apparatus for releasing the seat belt buckle. The seat belt buckle has a releasing device. The triggering apparatus comprises an opening device which is configured on the seat belt buckle and an opening device which is configured on the exterior of the motor vehicle. The two opening devices are connected via cable pulls to the releasing device, such that the belt buckle is released by the actuation of one of the opening devices.

In the case of vehicle occupants who cannot independently unbuckle themselves, the triggering apparatus disclosed in DE 33 43 132 A1 improves the operating convenience for a person unbuckling the vehicle occupant.

In the releasing device described in DE 33 43 132 A1, however, a transmission of an actuation, in particular of the opening device arranged on the vehicle exterior, is structurally complex.

Proceeding from the triggering apparatus disclosed in DE 33 43 132 A1, it is the object of the present invention to provide a seat belt system for a vehicle seat which provides a high level of operating convenience for a person buckling up the vehicle occupant and has a simple structural design.

This object is achieved by the seat belt system and by the vehicle seat in accordance with the independent claims.

According to the invention, therefore, a seat belt system for a vehicle seat is provided, the seat belt system comprising a belt webbing, a belt tongue and a belt buckle. The belt buckle has a releasing device for releasing the belt tongue in the belt buckle, and a first triggering element. In order to trigger the releasing device, the first triggering element can be moved in an opening direction such that the releasing device releases the belt tongue in the belt buckle and thus the belt tongue can be released from the belt buckle. The seat belt system according to the invention also comprises a second triggering element. The second triggering element can be moved in the opening direction of the first triggering element. The first triggering element and the second triggering element each comprise a gear rack with teeth. The first triggering element and the second triggering element are connected to each other by means of a rotated connecting element and two gears. The gears are fastened to opposite ends of the connecting element for conjoint rotation and engage with a respective gear rack of the gear racks.

The core idea of the invention is thus to transmit a triggering of the second triggering element, i.e. a displacement of the second triggering element in the opening direction, to the first triggering element via the gear racks, the gears and the connecting element, whereby due to the transmitted movement the first triggering element in turn triggers the releasing device and the belt tongue in the belt buckle is released.

Due to the two triggering elements, therefore, the seat belt system according to the invention has a high level of operating convenience for a person buckling up the vehicle occupant and is also designed in a structurally simple manner.

In a preferred embodiment, the seat belt system according to the invention comprises a belt fitting. The second triggering element is arranged on the belt fitting. The second triggering element can thus be arranged on the vehicle seat on a side in the vehicle seat transverse direction opposing the first triggering element which is a constituent part of the belt buckle.

In an exemplary embodiment, the seat belt system according to the invention comprises a restoring spring for restoring the first triggering element and the second triggering element counter to the opening direction.

The restoring spring is thus arranged, for example, such that by moving the first triggering element and the second triggering element it is compressed from a relaxed position and thus is tensioned. Due to this tension, the restoring spring automatically returns to the relaxed position as soon as a force causing the movement is removed, whereby this restoring spring displaces the first triggering element and the second triggering element counter to the opening direction.

In a preferred embodiment of the seat belt system according to the invention, the connecting element extends at right-angles to the opening direction.

The axis of rotation of the connecting element can extend at right-angles to the opening direction, in particular in the vehicle seat transverse direction.

The gear racks can extend in the opening direction.

In an exemplary embodiment of the seat belt system according to the invention, the second triggering element and/or the belt buckle can be fastened to the vehicle seat.

The present invention further relates to a vehicle seat which comprises a seat belt system described above.

In a preferred embodiment of the vehicle seat according to the invention, the belt buckle is arranged on the side of the vehicle seat which faces the vehicle exterior. The vehicle seat thus has a high level of operating convenience for a person buckling up the vehicle occupant.

The invention is explained in more detail hereinafter with reference to an exemplary embodiment which is shown in the drawings.

DETAILED DESCRIPTION OF THE DRAWINGS

Figure 1:
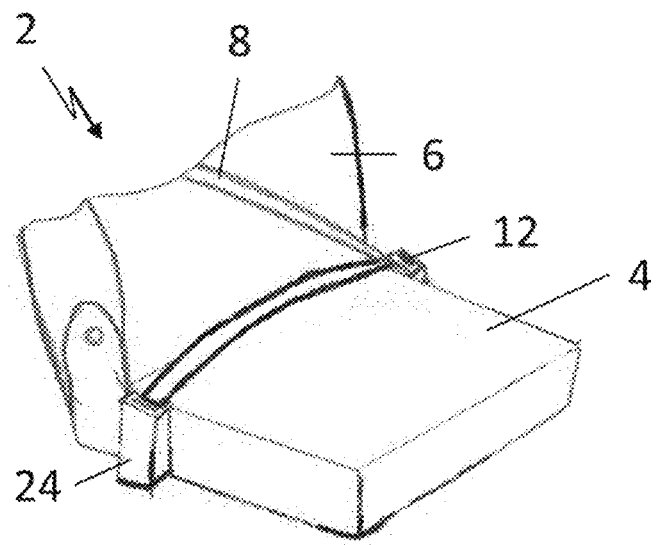
FIG. 1 is a perspective view of a portion of a vehicle seat according to an embodiment of the invention.

A portion of a vehicle seat 2 is shown in FIG. 1. The vehicle seat 2 comprises a seat part 4, a backrest 6 and a seat belt system.

Figure 2:
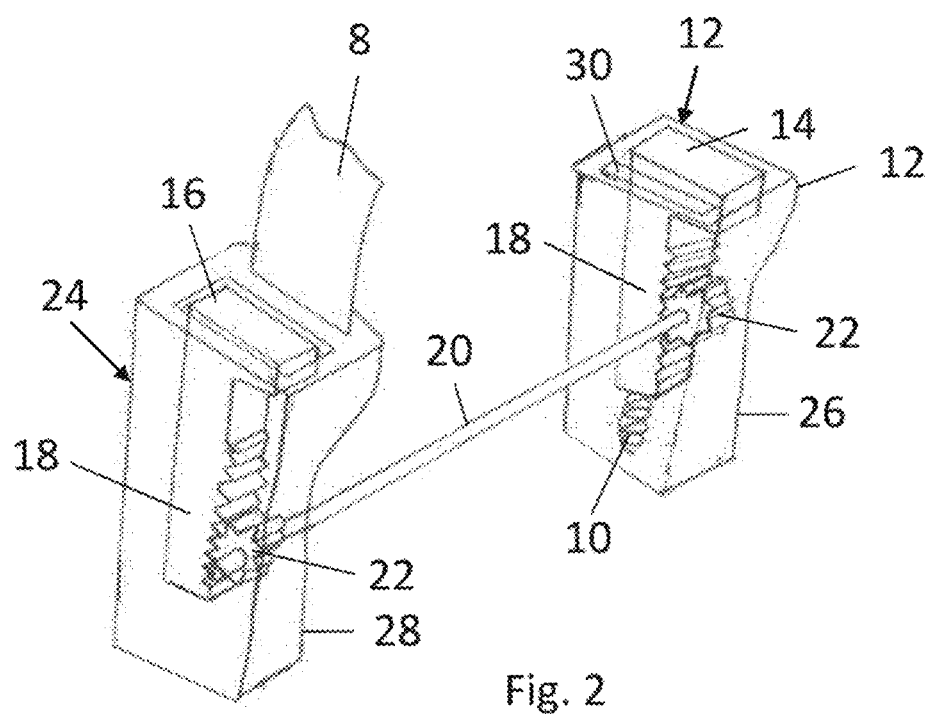
FIG. 2 is a perspective view of a portion of a seat belt system of the vehicle seat shown in FIG. 1.

As can be seen from FIG. 2, the seat belt system comprises a belt webbing 8, on which a belt tongue (not shown) is arranged, a belt buckle 12, and a belt fitting 24. Secondly, when the vehicle seat 2 is installed in a functional manner in a vehicle, the belt buckle 12 is arranged on the side of the vehicle seat which faces the vehicle exterior in the vehicle transverse direction. Thus a vehicle occupant, who cannot independently buckle themselves up, can be buckled up by a person outside the vehicle in a simple and convenient manner.

The belt buckle 12 comprises a housing 26 (shown transparently in FIG. 2). The housing 26 receives a first triggering element 14 and a releasing device (not shown) and forms a slot 30. The belt tongue can be fastened in the slot 30 for securing the seat belt in a secure position. The belt tongue in the belt buckle 12 can be released by means of the releasing device, so that the belt tongue can be removed from the belt buckle 12, and thus the seat belt, from the secure position.

The belt fitting 24 comprises a housing 28 which is shown transparently in FIG. 2 and a second triggering element 16.

The first triggering element 14 and the second triggering element 16 each comprise a gear rack 18. The gear racks 18 are engaged in each case with a gear 22. The gears 22 are fastened to opposite ends of a connecting element 20 for conjoint rotation. The connecting element 20 extends in the vehicle seat transverse direction. The gear racks 18 of the first triggering element 14 and the second triggering element 16 extend at right-angles to the connecting element 20 in a vehicle seat vertical direction and/or a vehicle seat longitudinal direction.

The first triggering element 14 is mounted in the housing 26 of the belt buckle 12 so as to be movable in an opening direction. The second triggering element 16 is mounted in the housing 28 of the belt fitting 24 so as to be movable in an opening direction corresponding to the opening direction of the first triggering element 14. By moving the first triggering element 14 from a resting position in the opening direction, the releasing device is triggered so that it releases the belt tongue in the belt buckle 12 and the belt tongue can be removed from the belt buckle 12.

If the second triggering element 16 is moved in the opening direction, the movement of the second triggering element 16 is transmitted to the first triggering element 14 via the gear racks 18, the gears 22 and the connecting element 20. The first triggering element 14 then in turn triggers the releasing device. The releasing device thus can be triggered by the actuation of the second triggering element 16.

So that the releasing device is not continually triggered, the belt buckle 12 comprises a restoring spring 10 for restoring the first triggering element 14 into the resting position counter to the opening direction. By moving the first triggering element 14 in the opening direction, the restoring spring 10 is compressed from a relaxed position and tensioned thereby. If a force causing the movement is removed, the restoring force of the restoring spring 10 results in the restoring spring 10 being automatically restored into the relaxed position. As a result, the first triggering element 14 and consequently also the second triggering element 16 are moved counter to the opening direction into the resting position.

It is also contemplated that a restoring spring is provided in the belt fitting 24, instead of the restoring spring 10 or in addition to the restoring spring 10.

LIST OF REFERENCE SIGNS

2 Vehicle seat
4 Seat element
6 Backrest
8 Belt webbing
Restoring spring
12 Belt buckle
14 First triggering element
16 Second triggering element
18 Gear rack
20 Connecting element
22 Gear
24 Belt fitting
26 Housing
28 Housing
30 Slot

What is claimed is:

1. A seat belt system for a vehicle seat, comprising:
   a belt webbing;
   a belt tongue;
   a belt buckle having a releasing device and a first triggering element which, in order to trigger the releasing device, is movable in an opening direction such that the releasing device releases the belt tongue in the belt buckle; and
   a second triggering element, the second triggering element being movable, wherein
   the first triggering element and the second triggering element each comprise a gear rack and are connected to each other via a rotatable connecting element and two gears, the two gears being fastened to opposite ends of the rotatable connecting element for conjoint rotation and engaging with a respective gear rack of the first and second triggering elements.

2. The seat belt system according to claim 1, further comprising:
   a belt fitting, wherein the second triggering element is arranged on the belt fitting.

3. The seat belt system according to claim 1, further comprising:
   at least one restoring spring for restoring the first triggering element and the second triggering element counter to the opening direction.

4. The seat belt system according to claim 1, wherein the rotatable connecting element extends at a right-angle to the opening direction.

5. The seat belt system according to claim 1, wherein the second triggering element and/or the belt buckle are fastenable to the vehicle seat.

6. A vehicle seat, comprising:
   a seat back and a seat part; and
   a seat belt system for the vehicle seat, comprising:
      a belt webbing;
      a belt tongue;
      a belt buckle having a releasing device and a first triggering element which, in order to trigger the releasing device, is movable in an opening direction such that the releasing device releases the belt tongue in the belt buckle; and
      a second triggering element, the second triggering element being movable, wherein
      the first triggering element and the second triggering element each comprise a gear rack and are connected to each other via a rotatable connecting element and two gears, the two gears being fastened to opposite ends of the rotatable connecting element for conjoint rotation and engaging with a respective gear rack of the first and second triggering elements.

7. The vehicle seat according to claim 6, further comprising:
   a belt fitting, wherein the second triggering element is arranged on the belt fitting, and
   wherein the belt fitting and the belt buckle are arranged on opposite sides of the seat part in a vehicle seat transverse direction.

8. The vehicle seat according to claim 7, wherein
   the belt buckle is arranged on a side of the vehicle seat which faces an exterior of a vehicle in an installed position.

* * * * *